US011454079B2

(12) United States Patent
Brunty et al.

(10) Patent No.: US 11,454,079 B2
(45) Date of Patent: Sep. 27, 2022

(54) RISER ASSIST FOR WELLSITES

(71) Applicant: U.S. Well Services LLC, Houston, TX (US)

(72) Inventors: Jeremy Brunty, Houston, TX (US); Randall Kimbler, Houston, TX (US); Dominic Chero, Houston, TX (US); Andrew Frame, Houston, TX (US); Robert Kurtz, Houston, TX (US)

(73) Assignee: U.S. Well Services LLC, Houston, TX (US)

( * ) Notice: Subject to any disclaimer, the term of this patent is extended or adjusted under 35 U.S.C. 154(b) by 78 days.

(21) Appl. No.: 16/871,328

(22) Filed: May 11, 2020

(65) Prior Publication Data
US 2020/0408060 A1 Dec. 31, 2020

Related U.S. Application Data

(63) Continuation of application No. 16/570,331, filed on Sep. 13, 2019, now Pat. No. 10,648,270.
(Continued)

(51) Int. Cl.
*E21B 19/06* (2006.01)
*E21B 33/068* (2006.01)
(Continued)

(52) U.S. Cl.
CPC ........... *E21B 33/068* (2013.01); *B66C 13/06* (2013.01); *F16F 15/023* (2013.01)

(58) Field of Classification Search
CPC ....... E21B 33/068; B66C 16/06; B66C 13/06; F16F 15/023
(Continued)

(56) References Cited

U.S. PATENT DOCUMENTS

| 1,541,601 A | 6/1925 | Tribe |
| 1,743,771 A | 1/1930 | Hall |

(Continued)

FOREIGN PATENT DOCUMENTS

| CA | 3067854 A1 | 1/2019 |
| CN | 104117308 A | 10/2014 |

(Continued)

OTHER PUBLICATIONS

Non-Final Office dated Oct. 26, 2020 in U.S. Appl. No. 15/356,436.
(Continued)

*Primary Examiner* — Paul T Chin
(74) *Attorney, Agent, or Firm* — Hogan Lovells US LLP (57) ABSTRACT

An apparatus and associated method is disclosed for a riser hanging system. The apparatus includes a first elongated member with a provision for a first external mechanical coupling at a distal location on the first elongated member. A second elongated member is mechanically coupled to the first elongated member at proximal locations on the first elongated member and the second elongated member. A third member is mechanically coupled to a first portion of the first elongated member. The third member includes a fourth member to move through at least a second portion of a length of the second elongated member. Mechanical couplers associated with the second elongated member are provided for a second external mechanical coupling of the riser to the apparatus. The riser may be hoisted using the apparatus for better control during coupling to the wellhead.

20 Claims, 6 Drawing Sheets

Related U.S. Application Data (60) Provisional application No. 62/731,501, filed on Sep. 14, 2018.

(51) Int. Cl.
  *B66C 13/06* (2006.01)
  *F16F 15/023* (2006.01)

(58) Field of Classification Search
  USPC .................................................. 294/102.2
  See application file for complete search history.

(56) References Cited

U.S. PATENT DOCUMENTS

| | | | |
|---|---|---|---|
| 1,967,466 A | 7/1934 | Damsel | |
| 2,244,106 A | 6/1941 | Granberg | |
| 2,976,025 A | 3/1961 | Pro | |
| 3,347,570 A | 10/1967 | Roessler | |
| 3,878,884 A | 4/1975 | Raleigh | |
| 3,967,841 A | 7/1976 | Kendrick | |
| 4,411,313 A * | 10/1983 | Johnson | E21B 33/068 |
| | | | 166/105 |
| 4,442,665 A | 4/1984 | Fick | |
| 4,538,916 A | 9/1985 | Zimmerman | |
| 4,601,629 A | 7/1986 | Zimmerman | |
| 4,768,884 A | 9/1988 | Elkin | |
| 4,783,038 A | 11/1988 | Gilbert | |
| 5,114,239 A | 5/1992 | Allen | |
| 5,293,947 A | 3/1994 | Stratton | |
| 5,334,899 A | 8/1994 | Skybyk | |
| 5,366,324 A * | 11/1994 | Arlt | E21B 19/006 |
| | | | 405/195.1 |
| 5,439,066 A | 8/1995 | Gipson | |
| 5,486,047 A | 1/1996 | Zimmerman | |
| 5,517,822 A | 5/1996 | Haws et al. | |
| 5,549,285 A | 8/1996 | Collins | |
| 5,606,853 A | 3/1997 | Birch | |
| 5,791,636 A | 8/1998 | Loziuk | |
| 5,798,596 A | 8/1998 | Lordo | |
| 5,813,455 A * | 9/1998 | Pratt | E21B 43/121 |
| | | | 166/310 |
| 5,894,888 A | 4/1999 | Wiemers | |
| 5,950,726 A | 9/1999 | Roberts | |
| 6,035,265 A | 3/2000 | Dister et al. | |
| 6,097,310 A * | 8/2000 | Harrell | E21B 47/22 |
| | | | 340/854.3 |
| 6,116,040 A | 9/2000 | Stark | |
| 6,121,705 A | 9/2000 | Hoong | |
| 6,273,193 B1 * | 8/2001 | Hermann | E21B 7/128 |
| | | | 166/350 |
| 6,315,523 B1 | 11/2001 | Mills | |
| 6,406,011 B1 | 6/2002 | Kosar | |
| 6,442,942 B1 | 9/2002 | Kopko | |
| 6,510,695 B1 | 1/2003 | Fisher | |
| 6,585,455 B1 * | 7/2003 | Petersen | E21B 19/006 |
| | | | 166/355 |
| 6,626,646 B2 | 9/2003 | Rajewski | |
| 6,765,304 B2 | 7/2004 | Baten et al. | |
| 6,788,022 B2 | 9/2004 | Sopko | |
| 6,837,910 B1 | 1/2005 | Yoshikawa | |
| 6,985,750 B1 | 1/2006 | Vicknair et al. | |
| 7,170,262 B2 | 1/2007 | Pettigrew | |
| 7,279,655 B2 | 10/2007 | Blutke | |
| 7,309,835 B2 | 12/2007 | Morrison | |
| 7,341,287 B2 | 3/2008 | Gibb | |
| 7,494,263 B2 | 2/2009 | Dykstra | |
| 7,717,193 B2 | 5/2010 | Egilsson | |
| 7,770,396 B2 | 8/2010 | Roby | |
| 7,795,830 B2 | 9/2010 | Johnson | |
| 7,807,048 B2 | 10/2010 | Collette | |
| 7,845,413 B2 | 12/2010 | Shampine | |
| 7,900,893 B2 | 3/2011 | Teurlay | |
| 7,940,039 B2 | 5/2011 | de Buda | |
| 8,146,665 B2 | 4/2012 | Neal | |
| 8,221,513 B2 | 7/2012 | Ariyapadi | |
| 8,272,439 B2 | 9/2012 | Strickland | |
| RE44,444 E | 8/2013 | Dole | |
| 8,506,267 B2 | 8/2013 | Gambier et al. | |
| 8,556,302 B2 | 10/2013 | Dole | |
| 8,616,274 B2 | 12/2013 | Belcher | |
| 8,763,387 B2 | 7/2014 | Schmidt | |
| 8,789,601 B2 | 7/2014 | Broussard | |
| 8,795,525 B2 | 8/2014 | McGinnis et al. | |
| 8,905,056 B2 | 12/2014 | Kendrick | |
| 8,997,904 B2 | 4/2015 | Cryer | |
| 9,051,923 B2 | 6/2015 | Kuo | |
| 9,062,545 B2 | 6/2015 | Roberts et al. | |
| 9,140,105 B2 * | 9/2015 | Pattillo | E21B 33/0415 |
| 9,353,593 B1 * | 5/2016 | Lu | E21B 33/068 |
| 9,410,410 B2 | 8/2016 | Broussard | |
| 9,450,385 B2 | 9/2016 | Kristensen | |
| 9,482,086 B2 | 11/2016 | Richardson et al. | |
| 9,506,333 B2 | 11/2016 | Castillo et al. | |
| 9,534,473 B2 | 1/2017 | Morris | |
| 9,706,185 B2 | 7/2017 | Ellis | |
| 9,739,546 B2 | 8/2017 | Bertilsson et al. | |
| 9,745,840 B2 | 8/2017 | Oehring | |
| 9,790,858 B2 | 10/2017 | Kanebako | |
| 9,840,901 B2 | 12/2017 | Oehring | |
| 9,893,500 B2 | 2/2018 | Oehring | |
| 9,903,190 B2 | 2/2018 | Conrad | |
| 9,945,365 B2 | 4/2018 | Hernandez et al. | |
| 9,970,278 B2 | 5/2018 | Broussard | |
| 10,020,711 B2 | 7/2018 | Oehring | |
| 10,119,381 B2 | 11/2018 | Oehring | |
| 10,184,465 B2 | 1/2019 | Enis et al. | |
| 10,221,639 B2 | 3/2019 | Romer et al. | |
| 10,254,732 B2 | 4/2019 | Oehring | |
| 10,280,724 B2 | 5/2019 | Hinderliter | |
| 10,302,079 B2 | 5/2019 | Kendrick | |
| 10,337,308 B2 | 7/2019 | Broussard | |
| 10,408,030 B2 | 9/2019 | Oehring | |
| 10,408,031 B2 | 9/2019 | Oehring | |
| 10,415,332 B2 | 9/2019 | Morris et al. | |
| 10,526,882 B2 | 1/2020 | Oehring | |
| 10,627,003 B2 | 4/2020 | Dale et al. | |
| 10,648,270 B2 * | 5/2020 | Brunty | F16F 15/023 |
| 10,648,311 B2 | 5/2020 | Oehring | |
| 10,669,471 B2 | 6/2020 | Schmidt et al. | |
| 10,686,301 B2 | 6/2020 | Oehring et al. | |
| 10,690,131 B2 | 6/2020 | Rashid | |
| 10,695,950 B2 | 6/2020 | Igo et al. | |
| 10,711,576 B2 | 7/2020 | Bishop | |
| 10,731,561 B2 | 8/2020 | Oehring et al. | |
| 10,740,730 B2 | 8/2020 | Altamirano et al. | |
| 10,767,561 B2 | 9/2020 | Brady | |
| 10,781,752 B2 | 9/2020 | Kikkawa et al. | |
| 10,794,165 B2 | 10/2020 | Fischer et al. | |
| 10,934,824 B2 | 3/2021 | Oehring | |
| 10,988,998 B2 | 4/2021 | Fischer et al. | |
| 11,091,992 B2 | 8/2021 | Broussard | |
| 2001/0000996 A1 | 5/2001 | Grimland et al. | |
| 2003/0079875 A1 | 1/2003 | Weng | |
| 2003/0057704 A1 | 3/2003 | Baten | |
| 2004/0045703 A1 * | 3/2004 | Hooper | E21B 19/20 |
| | | | 166/77.51 |
| 2005/0061548 A1 * | 3/2005 | Hooper | E21B 19/20 |
| | | | 175/52 |
| 2005/0116541 A1 | 6/2005 | Seiver | |
| 2005/0201197 A1 | 9/2005 | Duell et al. | |
| 2006/0109141 A1 | 5/2006 | Huang | |
| 2007/0125544 A1 | 6/2007 | Robinson | |
| 2007/0201305 A1 | 8/2007 | Heilman | |
| 2008/0095644 A1 | 4/2008 | Mantei et al. | |
| 2008/0164023 A1 | 7/2008 | Dykstra et al. | |
| 2008/0217024 A1 | 9/2008 | Moore | |
| 2008/0236818 A1 | 10/2008 | Dykstra | |
| 2008/0257449 A1 | 10/2008 | Weinstein et al. | |
| 2008/0277120 A1 | 11/2008 | Hickie | |
| 2008/0288115 A1 | 11/2008 | Rusnak | |
| 2009/0068031 A1 | 3/2009 | Gambier | |
| 2009/0068301 A1 | 3/2009 | Gambier | |
| 2009/0072645 A1 | 3/2009 | Quere | |
| 2009/0078410 A1 | 3/2009 | Krenek | |

(56) References Cited

U.S. PATENT DOCUMENTS

| | | |
|---|---|---|
| 2009/0114392 A1 | 5/2009 | Tolman |
| 2009/0153354 A1 | 6/2009 | Daussin |
| 2009/0308602 A1 | 12/2009 | Bruins |
| 2009/0315297 A1 | 12/2009 | Nadeau |
| 2010/0038907 A1 | 2/2010 | Hunt |
| 2010/0193057 A1 | 8/2010 | Garner |
| 2010/0250139 A1 | 9/2010 | Hobbs |
| 2010/0281876 A1 | 11/2010 | Khan |
| 2011/0052423 A1 | 3/2011 | Gambier et al. |
| 2011/0061855 A1 | 3/2011 | Case |
| 2011/0081268 A1 | 4/2011 | Ochoa et al. |
| 2011/0110793 A1 | 5/2011 | Leugemores et al. |
| 2011/0175397 A1 | 7/2011 | Amrine |
| 2011/0197988 A1 | 8/2011 | Van Vliet |
| 2011/0241590 A1 | 10/2011 | Horikoshi |
| 2012/0063936 A1 | 3/2012 | Baxter et al. |
| 2012/0112757 A1 | 5/2012 | Vrankovic |
| 2012/0150455 A1 | 6/2012 | Franklin et al. |
| 2012/0152716 A1 | 6/2012 | Kikukawa et al. |
| 2012/0255734 A1 | 10/2012 | Coli |
| 2013/0051971 A1 | 2/2013 | Wyse et al. |
| 2013/0078114 A1 | 3/2013 | Van Rijswick |
| 2013/0138254 A1 | 5/2013 | Seals |
| 2013/0180722 A1 | 7/2013 | Olarte Caro et al. |
| 2013/0189629 A1 | 7/2013 | Chandler |
| 2013/0255271 A1 | 10/2013 | Yu et al. |
| 2013/0284455 A1 | 10/2013 | Kajaria et al. |
| 2013/0299167 A1 | 11/2013 | Fordyce et al. |
| 2013/0306322 A1 | 11/2013 | Sanborn |
| 2014/0077607 A1 | 3/2014 | Clarke |
| 2014/0138079 A1 | 5/2014 | Broussard |
| 2014/0174717 A1 | 6/2014 | Broussard |
| 2014/0294603 A1 | 10/2014 | Best |
| 2015/0114652 A1 | 4/2015 | Lestz |
| 2015/0144336 A1 | 5/2015 | Hardin |
| 2015/0147194 A1 | 5/2015 | Foote |
| 2015/0233530 A1 | 8/2015 | Sandidge |
| 2015/0252661 A1 | 9/2015 | Glass |
| 2016/0006311 A1 | 1/2016 | Li |
| 2016/0230660 A1 | 8/2016 | Zeitoun et al. |
| 2016/0258267 A1 | 9/2016 | Payne |
| 2016/0273456 A1 | 9/2016 | Zhang et al. |
| 2016/0290114 A1 | 10/2016 | Oehring |
| 2016/0326853 A1 | 11/2016 | Fred et al. |
| 2016/0326854 A1 | 11/2016 | Broussard |
| 2016/0348479 A1 | 12/2016 | Oehring |
| 2017/0016433 A1 | 1/2017 | Chong |
| 2017/0043280 A1 | 2/2017 | Vankouwenberg |
| 2017/0074076 A1 | 3/2017 | Joseph et al. |
| 2017/0082033 A1 | 3/2017 | Wu et al. |
| 2017/0096889 A1 | 4/2017 | Blanckaert et al. |
| 2017/0138171 A1 | 5/2017 | Richards et al. |
| 2017/0159654 A1 | 6/2017 | Kendrick |
| 2017/0204852 A1 | 7/2017 | Barnett |
| 2017/0212535 A1 | 7/2017 | Shelman et al. |
| 2017/0226838 A1 | 8/2017 | Ceizobka et al. |
| 2017/0226842 A1 | 8/2017 | Omont |
| 2017/0370639 A1 | 12/2017 | Barden et al. |
| 2018/0090914 A1 | 3/2018 | Johnson et al. |
| 2018/0181830 A1 | 6/2018 | Luharuka et al. |
| 2018/0259080 A1 | 9/2018 | Dale et al. |
| 2018/0266217 A1 | 9/2018 | Funkhauser et al. |
| 2018/0284817 A1 | 10/2018 | Cook et al. |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0363640 A1 | 12/2018 | Kajita et al. |
| 2018/0366950 A1 | 12/2018 | Pedersen et al. |
| 2019/0040727 A1 | 2/2019 | Oehring et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0249527 A1 | 8/2019 | Kraynek |
| 2019/0257462 A1 | 8/2019 | Rogers |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0325760 A1 | 10/2020 | Markham |
| 2020/0350790 A1 | 11/2020 | Luft et al. |

FOREIGN PATENT DOCUMENTS

| | | |
|---|---|---|
| CN | 104196613 A | 12/2014 |
| CN | 205986303 U | 2/2017 |
| CN | 108049999 A | 5/2018 |
| CN | 112196508 A | 1/2021 |
| WO | 00/47893 | 8/2000 |
| WO | 2009046280 | 4/2009 |
| WO | 2012/051705 | 4/2012 |
| WO | 2014/116761 | 7/2014 |
| WO | 2014/177346 | 11/2014 |
| WO | 2014177346 | 11/2014 |
| WO | 2018044307 A1 | 3/2018 |
| WO | 2018213925 A1 | 11/2018 |
| WO | 2019210417 | 11/2019 |

OTHER PUBLICATIONS

Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-bumer) 06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wiklpedia.org/w/index.php?title=Heat_exchanger&oldid=89300146) Dec. 18, 2019 Apr. 18, 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.

(56) References Cited

OTHER PUBLICATIONS

Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
*U.S. Well Services, LLC* v. *Tops Well Services, LLC* and *Honghua America, LLC*, Case No. 3:19-cv-00237, Document 72-9, Declaration of Dr. Robert Schaaf, Apr. 24, 2020, 52 pages.
*U.S. Well Services, LLC* v. *Tops Well Services, LLC* and *Honghua America, LLC*, Case No. 3:19-cv-00237 Document 72-9, Declaration of Dr. Robert Schaaf—part 2, Apr. 24, 2020, 128 pages.
*U.S. Well Services, LLC* v. *Tops Well Services, LLC* and *Honghua America, LLC*, Case No. 3:19-cv-00237, Document 72-9, Declaration of Dr. Robert Schaaf—part 3, Apr. 24, 2020, 47 pages.
*U.S. Well Services, LLC* v. *Tops Well Services, LLC* and *Honghua America, LLC*, Case No. 3:19-cv-00237, Document 72, Plaintiff's Opening Claim Construction Brief, Apr. 24, 2020, 37 pages.
*U.S. Well Services, LLC* v. *Tops Well Services, LLC* and *Honghua America, LLC*, Case No. 3:19-cv-00237, Document 1, Plaintiff's Original Complaint, 63 pages.
*U.S. Well Services, LLC* v. *Tops Well Services, LLC* and *Honghua America, LLC*, Case No. 3:19-cv-00237, Document 90, Plaintiff's Opposition to Defendants' Motion for Summary Judgment of Invalidity under 35 USC 112, 30 pages.
*U.S. Well Services, LLC* v. *Tops Well Services, LLC* and *Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC* v. *Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC* v. *Signfiy North America Corp., Signify Holding B.V.*, and *Signify N.V.*, Case No. 6:20-cv-01056-ADA, Document 24, Scheduling Order, Aug. 13, 2021, 4 pages.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
*U.S. Well Services, Inc.* and *U.S. Well Services, LLC* v. *Halliburton Company* and *Cimarex Energy Co.*, Case No. 6:21-cv-00367-ADA, Document 51, Agreed Scheduling Order, Sep. 16, 2021, 5 pages.
*U.S. Well Services, Inc.* and *U.S. Well Services, LLC* v. *Halliburton Company* and *Cimarex Energy Co.*, Case No. 6:21-cv-00367-ADA, Plaintiff's Disclosure of Asserted Claims and Preliminary Infringement Contentions, Jul. 12, 2021, 9 pages.
*U.S. Well Services, Inc.* and *U.S. Well Services, LLC* v. *Halliburton Company* and *Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc.* and *U.S. Well Services, LLC* v. *Halliburton Company* and *Cimarex Energy Co.*, Case No. 6:21-cv-00367-ADA, Defendants' Preliminary Invalidity Contentions, Sep. 10, 2021, 193 pages.
*U.S. Well Services, Inc.* and *U.S. Well Services, LLC* v. *Halliburton Company* and *Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 IEEE, Paper No. PCIC-2010-22, 10 pages.
American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-1 25-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph.D., Case Nos. IPR2021-01032, IPR2021-01033, and IPR2021-01034, Jun. 18, 2021, 173 pages.
Stephen Cary et al., "Electric Rotating Machine Standards Part II: Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, http://www.emi-magazine.com, 5 pages.

(56) References Cited

OTHER PUBLICATIONS

Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
U.S. Pat. No. 8,789,601, 159 pages.
U.S. Pat. No. 9,410,410, 263 pages.
U.S. Pat. No. 10,337,308, 861 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-fracturing-technology-reduces-emissions-by-99.html, 4 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
D. Bogh et al., "A User's Guide to Factory Testing of Large Motors: What Should Your Witness Expect," IEEE, accessed Jun. 10, 2021, 8 pages.
Ryan Davis, "Albright Says He'll Very Rarely Put Cases On Hold For PTAB," Law 360, https://www.law360.com/articles/1381597/print?section=ip, 2 pages.
Dani Kass, "Fintiv Fails: PTAB Uses 'Remarkably Inaccurate' Trial Dates," Nov. 2, 2021, Law 360, 1 page.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
T. W. Pascall et al., "Navigating the Test Requirements of API 541 4th Edition," 2007, IEEE, Paper No. PCIC-2007-11, 12 pages.
"Kerr Pumps & FlowVale Awards for Excellence in Well Completion, Northeast 2017—Awarded to: U.S. Well Services, https://www.oilandgasawards.com/winner/northeast-2017-kerr-pumps-flowvale-awards..", accessed Oct. 5, 2021, 4 pages.
"New Technology Development Award—General/Products, Northeast 2015—Awarded to: U.S. Well Services, LLC," https://www.oilandgasawards.eom/winner/northeast-2015-new-technology-development-award-generalproducts/#, accessed Aug. 23, 2021, 4 pages.
*U.S. Well Services, Inc. v. Halliburton Company*, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
A. T. Dufresne, "How reliable are trial dates relied on by the PTAB in the Fintiv analysis?" Perkins Coie, 2021, 3 pages.
J. Malinowski et al., "Petrochemical Standards A Comparison Between IEEE 841-2001, API 541, and API 547," 2004, IEEE, Paper No. PCIC-2004-22, 8 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit php, accessed Sep. 22, 2021, 2 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
U.S. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.
Services—U.S. Well Services, http://uswellservices.com/services/, accessed Nov. 13, 2021, 10 pages.
Publications, U.S. Department of Labor—Occupational Safety and Health Administration, https://web.archive.org/web/20150626140537/https://www.osha.gov/pls/publications/publication.html, 47 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
U.S. Department of Labor—Occupational Safety and Health Administration, https://web.archive.org/web/20150406152927/https://www.osha.gov/, 4 pages.
Steven C. Carlson, Weaponizing IPRs, Landslide, Sep. 22, 2019, 10 pages.
Declaration of Dr. Mark Ehsani, IPR2021-01066, Jul. 2, 2021, 213 pages.
Declaration of Robert Schaaf, IPR2021-01066, Nov. 17, 2021, 43 pages.
U.S. Pat. No. 10,020,711, 250 pages.
U.S. Appl. No. 62/323,303, 62 pages.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.
Declaration of Robert Schaaf, IPR2021-01238, Nov. 17, 2021, 38 pages.
John A. Camera, PE, Electrical Engineering Reference Manual for the Electrical and Computer PE Exam, Sixth Edition, 2002, 102 pages.
U.S. Pat. No. 10,526,882, 845 pages.
U.S. Pat. U.S. Appl. No. 62/180,289, 32 pages.
IEEE 100 The Authoritative Dictionary of IEEE Standards Terms Seventh Edition, 2000, 7 pages.
National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review / Professional Engineering Licensing, What PPI Customers Say, https://web.archive.Org/web/20031226130924/http://ppi2pass.com:80/catalog/servlet/MyPpi_pg_comments-EEcomments.html, accessed Jul. 22, 2021, 2 pages.
Professional Publications, Inc., FE Exam, PE Exam, ARE Exam, and NCIDQ Exam Review / Professional Engineering Licensing, Homepage, https://web.archive.Org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review / Professional Engineering Licensing, The PPI Online Catalog, https://web.archive.Org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review / Professional Engineering Licensing, Electrical PE Exam Review Products, https://web.archive.org/web/

(56) References Cited

OTHER PUBLICATIONS

20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., Electrical Engineering Reference Manual, 12 pages.
Professional Publications, Inc., Books for the FE, PE, FLS and PLS Exams, Spring 2004, http7Avww.ppi2pass.com/corner/catalog.pdf, 16 pages.
Lionel B. Roe, Practices and Procedures of Industrial Electrical Design, 1972, McGraw-Hill, Inc., Chapter 2: The Basic Electric System, 11 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Robert Durham, IPR2021-01315, Aug. 12, 2021, 209 pages.
Declaration of Robert Schaaf, IPR2021-01315, Nov. 19, 2021, 39 pages.
U.S. Pat. No. 9,893,500, 106 pages.
U.S. Pat. No. 9,893,500, 291 pages.
U.S. Appl. No. 62/323,168, 41 pages.
*U.S. Well Services, Inc.* and *U.S. Well Services, LLC* v. *Halliburton Company* and *Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc.* v. *Halliburton Company*, Case No. 6:21-cv-00367-ADA, Civil Docket, accessed Dec. 17, 2021, 14 pages.
*U.S. Well Services, Inc.* v. *Halliburton Company*, Case No. 6:21-cv-00367-ADA, Document 64, Order Resetting Markman Hearing, Decembers, 2021, 1 page.
Approved American National Standard, ANSI/NEMA MG Jan. 2011, American National Standard Motors and Generators, Dec. 9, 2021, 636 pages.
Comprehensive Power: Power it Up, Feb. 27, 2013, 28 pages.
Comprehensive Power: Power it Up, Brochure, 26 pages.
Declaration of Robert Schaaf, IPR2021-01316, Nov. 19, 2021, 33 pages.
Declaration of Robert Durham, IPR2021-01316, Aug. 13, 2021, 75 pages.
U.S. Pat. No. 10,280,724, 668 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.
U.S. Pat. No. 10,408,031, 734 pages.
Maxwell James Clerk 1868, On Governors, Proc. R. Soc. Lond., pp. 16270-283.
Katsuhiko Ogata, Modern Control Engineering: Third Edition, 1997, 2 pages.
49 C.F.R. Part 393 (Oct. 1, 2006), 36 pages.
The American Heritage Dictionary of the English Language, Fifth Edition, Fiftieth Anniversary, p. 911.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
U.S. Pat. No. 10,648,311, 1,804 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.
Random House Webster's Unabridged Dictionary, Second Edition, 2001, p. 990.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
Society of Automotive Engineers, SAE J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter (NETRS2321P)," StarTech, http://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," Atc, http://www.amazon.com/Ethemet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethernet-lntelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
U.S. Pat. No. 10,254,732, 552 pages.
U.S. Appl. No. 62/204,331, 22 pages.
Eugene A. Avallone, Marks' Standard Handbook for Mechanical Engineers: 11th Edition, 2007, p. 16-4 and 16-22.
Moxa 802.11 Ethernet to Serial, Moxastore, http://www.moxastore.com/Mloxa_802_11_Wi_Fi_Ethernet_to_Serial_s/587.html, May 24, 2016, 1 page.
Project Registration, Moxastore, http://www.moxastore.com, Feb. 15, 2015, 2 pages.
About Us, Moxastore, http://www.moxastore.com/aboutus.asp, Mar. 8, 2015, 1 page.
NPORTIA5250, Moxastore, http://www.moxastore.com/NPORTIA5250_p/nportia5250.htm.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
CoorsTek Flowguard Products, 2012, 8 pages.
Declaration of Sylvia D. Hall-Ellis, IPR2022-00610, Feb. 28, 2022, 98 pages.
U.S. Pat. No. 10,119,381, 24 pages.
U.S. Pat. No. 10,934,824, 24 pages.

(56) References Cited

OTHER PUBLICATIONS

Flowline Products and Services, FMC Technologies, http://www.fmctechnologies.com, 80 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip. . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
Gardner Denver, 3" 1502 Male Hammer Union Discharge Flange, 2005, 13 pages.
Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Email from Michael See on Jun. 10, 2021 regarding API-541 Fourth Edition: Public Availability, 2 pages.
Halliburton, Halliburton All-Electric Fracturing Reducing Emissions and Cost Brochure, 2021, 6 pages.
IEEE Power Engineering Society, 112 IEEE Standard Test Procedure for Polyphase Induction Motors and Generators, 2004, 87 pages.
*U.S. Well Services, LLC* v. *Tops Well Services, LLC*, Case No. 3:19-cv-237, Document 135, Order, Sep. 22, 2021, 2 pages.
*U.S. Well Services, Inc.* and *U.S. Well Services, LLC* v. *Halliburton Company* and *Cimarex Energy Co.*, Case No. 6:21-cv-00367-ADA, Document 56, Defendants' Opening Claim Construction Brief, Oct. 27, 2021, 46 pages.
"Screenshot of USWS Clean Fleet System Video," 1 page.
John Daniel, "8.30 DEP Industry Observations: New Flac Fleet; New Fleet Designs Forthcoming," Daniel Energy Partners, Aug. 30, 2020, 13 pages.
Declaration of Joel N. Broussard, IPR2021-01034, IPR2021-01035, IPR2021-01036, and IPR2021-01037, Oct. 20, 2021, 11 pages.
Declaration of Robert Schaaf, IPR2021-01034, Oct. 20, 2021, 47 pages.
Declaration of Dr. Mark Ehsani, IPR2021-01035, Jun. 18, 2021, 188 pages.
U.S. Pat. No. 9,970,278, 310 pages.
Stan Gibilisco, The Illustrated Dictionary of Electronics: Audio/Video Consumer Electronics Wireless Technology—Eighth Edition, 2001, p. 667.
Declaration of Robert Schaaf, IPR2021-01035, Oct. 20, 2021, 51 pages.
Declaration of Dr. L. Brun Hilbert, P.E., IPR2021-01037 and IPR2021-01038, Jun. 21, 2021, 124 pages.
U.S. Pat. No. 9,745,840, 215 pages.
U.S. Pat. No. 10,408,030, 401 pages.
U.S. Appl. No. 62/242,173, 17 pages.
Declaration of Robert Schaaf, IPR2021-01037, Oct. 20, 2021, 52 pages.
Zeus Electric Pumping Unit, Halliburton, http://www.halliburton.com/en/products/zeus-electric-pumping-unit, 2021, 4 pages.
Declaration of Joel N. Broussard, IPR2021-01038, Oct. 20, 2021, 11 pages.
*LedComm LLC* v. *Signify North America Corporation*, Case No. 6:20-cv-01056-ADA, Civil Docket, accessed Dec. 8, 2021, 11 pages.
*U.S. Well Services, Inc.* v. *Halliburton Company*, Case No. 6:21-cv-00367-ADA, Civil Docket, accessed Dec. 13, 2021, 14 pages.
Declaration of Robert Schaaf, IPR2021-01038, Nov. 10, 2021, 40 pages.
*Transcend Shipping Systems LLC* v. *Mediterranean Shipping Company S.A.*, Case No. 6:21-cv-00040, Document 27, Order of Dismissal with Prejudice, Dec. 7, 2021, 1 page.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
America Invents Act, H.R. Rep. No. 112-98, Jun. 1, 2011, 165 pages.
Declaration of Joel N. Broussard, IPR2021-01065, Oct. 20, 2021, 11 pages.
Declaration of Dr. Robert Durham, IPR2021-01065, Jun. 18, 2021, 138 pages.
Declaration of Robert Schaaf, IPR2021-01065, Nov. 10, 2021, 33 pages.
U.S. Pat. No. 9,410,410, Excerpt—Response to Non-Final Office Action filed Feb. 3, 2016, 57 pages.
U.S. Pat. No. 9,840,901, 216 pages.
U.S. Appl. No. 62/242,566, 34 pages.
Industrial Safety & Hygiene News, OSHA issues hazard alert for fracking and drilling, Jan. 6, 2015, 1 page.
Portfolio Media Inc., A Shift to Sand: Spotlight on Silica Use in Fracking, Law360, https://www.law360.com/articles/366057/print?section=energy, accessed Jun. 10, 2021, 5 pages.
Henry Chajet, "OSHA Issues Alert on Non-Silica Fracking Hazards," Jan. 30, 2015, National Law Review Newsroom, 2 pages.
*U.S. Well Services, LLC*, v. *Voltagrid LLC, Nathan Ough, Certarus (USA) Ltd.*, and *Jared Oehring*, Case No. 4:21-cv-3441-LHR, Document 13, Plaintiff U.S. Well Services, LLC's Motion for Preliminary Injunction and Request for Hearing, Nov. 4, 2021, 311 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
Occupational Safety and Health Administration—Home, United States Department of Labor, https://web.archive.org/web/20120722160756/http://www.osha.gov/, accessed Jun. 13, 2021, 2 pages.
Industry/Hazard Alerts, United States Department of Labor, https://web.archive.org/web/20120801064838/http://www.osha.gov:80/hazardindex.html, accessed Jun. 13, 2021, 1 page.
Hazard Alert—Worker Exposure to Silica during Hydraulic Fracturing, United States Department of Labor, https://web.archive.org/web/20120808200919/http7/www.osha.gov/dts/hazardalerts/hydraulic_frac_hazard_alert.html, accessed Jun. 13, 2021, 5 pages.
A. Abbott, Crippling the Innovation Economy: Regulatory Overreach at the Patent Office, Regulatory Transparency Project, Aug. 14, 2017, 35 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.

(56) References Cited

OTHER PUBLICATIONS

Testimony of Judge Paul R. Michel (Ret.) United States Court of Appeals for the Federal Circuit Before the Subcommittee on Intellectual Property, U.S Senate Committee on the Judiciary, Jun. 4, 2019, 8 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Mike Soraghan, OSHA issues hazard alert for fracking and drilling, E&E, Dec. 10, 2014, 1 page.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://wwww.spglobal.com/marketintelligence/en/news-insights/latest-news-headlines/growth-in-electric-fracking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
*U.S. Well Services, Inc.*, and *U.S. Well Services, LLC* v. *Halliburton Company, Cimarex Energy Co., Halliburton Energy Services, Inc.*, and *Halliburton US Techologies, Inc.*, Case No. WA:21-CV-00367-ADA, Document 61, Order Setting Markman Hearing, Nov. 29, 2021, 1 page.
*U.S. Well Services, Inc.*, and *U.S. Well Services, LLC* v. *Halliburton Company, Cimarex Energy Co., Halliburton Energy Services, Inc.*, and *Halliburton US Techologies, Inc.*, Case No. WA:21-CV-00367-ADA, Document 61, Order Resetting Markman Hearing, Dec. 8, 2021, 1 page.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.

\* cited by examiner

RISER ASSIST FOR WELLSITES

RELATED APPLICATIONS

This Application is a continuation of and claims the benefit of priority from U.S. patent application Ser. No. 16/570,331 filed Sep. 13, 2019 entitled "Riser Assist for Wellsites," which is now U.S. Pat. No. 10,648,270, issued May 12, 2020, which in turn claims the benefit of priority from U.S. Provisional Application No. 62/731,501, filed Sep. 14, 2018, entitled "Riser Assist For Wellsites," which are all incorporated by reference in their entirety herein for all intents and purposes.

BACKGROUND

1. Field Of Invention

The present disclosure generally relates to wellhead systems. In particular, the present disclosure relates to an apparatus and method for hanging risers in wellheads.

2. Related Technology

Mobile systems, including cranes and manual operators are used in wellsites to assist with installation and maintenance of wellheads and wellbores in subterranean fissures and in sea-based regions of a hydrocarbon producing environment. The processes used in the websites rely on very heavy machinery and the use of a large amount of complex equipment, including trailers and trucks, to transport the engines to and from a wellsite. In addition, such machinery is operated by one or more human operators and subjects a human operator to risks due to unpredictable and unforeseen actions of certain control mechanisms. In addition, there may be substantial time requirements and complex capability requirements for the human operator to manage placement of wellhead features into required positions for safe operation of the wellhead.

For example, considerable time is spent hanging risers on wellheads. In addition multiple operators may be required to coordinate this process. The hydrocarbon producing environment may also be hazardous and subjects human operations to unnecessary exposure to the elements. There may be very little room for error. Accuracy is important to prevent side loading and binding of connections during riser hanging processes, and to achieve maximum allowed freedom in each line of the machinery. An existing process for hanging risers on the well head uses a lifting strap and tag lines. Adjustment of the angle of the riser in this existing process may be difficult, without using multiple operators to manually interact with at least a portion of the riser assembly, in the area of the riser assembly, and without the use of the tag line. This existing process also, then, requires the use of an angle finder to find the angle of the risers as the operation, using the tag lines, is ongoing.

SUMMARY

Herein disclosed are examples of an apparatus and a method using the apparatus to resolve the above-identified issues in the use of cranes and tag lines to control the process of hanging risers for use with wellheads.

The apparatus includes a first elongated member with a provision for a first external mechanical coupling at a distal location on the first elongated member. The first external mechanical coupling allows a hoist to be associated with the apparatus. A second elongated member is mechanically coupled to the first elongated member at proximal locations on the first elongated member and the second elongated member. A third member is mechanically coupled to a first portion of the first elongated member. Further, the first portion includes a damping system. The third member includes a fourth member that can move through at least a second portion of a length of the second elongated member. Mechanical couplers are provided with association to the second elongated member. The mechanical couplers are for a second external mechanical coupling. The second external mechanical coupling allows the apparatus to be associated with the riser. The use of a method with the apparatus (and the apparatus itself) allows a crane or other hoist to control riser motions with more accuracy and with improved safety for associating the riser with a wellhead, for instance.

The method or a process herein enables lifting a riser associated with a wellhead. A sub-process of the method provides an apparatus with a first elongated member having a provision for an external mechanical coupling at a distal location. The method mechanically hinges a second elongated member to the first elongated member at proximal locations on the first elongated member and the second elongated member. The method further hinges, mechanically, a third member to a first portion of the first elongated member is required. The first portion includes a damping system. The third member is provided with a fourth member that moves through at least a first portion of a length of the second elongated member. A sub-process of the method enables mechanical coupling for the apparatus to the riser using at least one mechanical coupler on the second elongated member.

BRIEF DESCRIPTION OF THE DRAWINGS

Some of the features and benefits of the present invention having been stated, others will become apparent as the description proceeds when taken in conjunction with the following accompanying drawings.

DETAILED DESCRIPTION OF THE DISCLOSURE

So that the manner in which the features and advantages of the embodiments of hydraulic fracturing system and associated methods, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

The present disclosure uses a riser hanging tool or system, which may also be used for other aspects of the wellhead processes or in the wellsites for lifting purposes. The riser hanging tool enables management or control of angles between the riser being lifted into place and the wellhead, for instance. The maximum allowable angle to prevent damage to the riser, for example, may be identified from an original equipment manufacture's specifications (OEM specifications) and may be adjusted into the riser hanging tool. In an example, a damping system in the riser hanging tool is able to use angle specifications (or related damping values predetermined for the damping system) to control the movement of the riser in relation to the wellhead when a hoist moves the riser into place with the wellhead. In an aspect, the damping system utilizes a hydraulic cylinder. An adjustment range for the hydraulic cylinder is calculated from the angle of operation allowed to the riser. For example, the adjustment range may be within OEM's recommendation of 35 degrees +/−5%. With the riser hanging tool, a single operator may operate the hydraulic cylinder. The single operator may be in a man basket overlooking the wellhead. This eliminates hazardous conditions by not requiring the operator to remain under or near the suspended load (e.g., riser in this example). The use of the riser hanging tool also promotes accuracy as the adjustment made to the angle requirements ensure a quick and accurate placement of the riser to the wellhead. In addition, the riser hanging tool may be installed by a quick latch system that can be quickly disconnected after installation and connected to the next riser, for instance.

Figure 1:
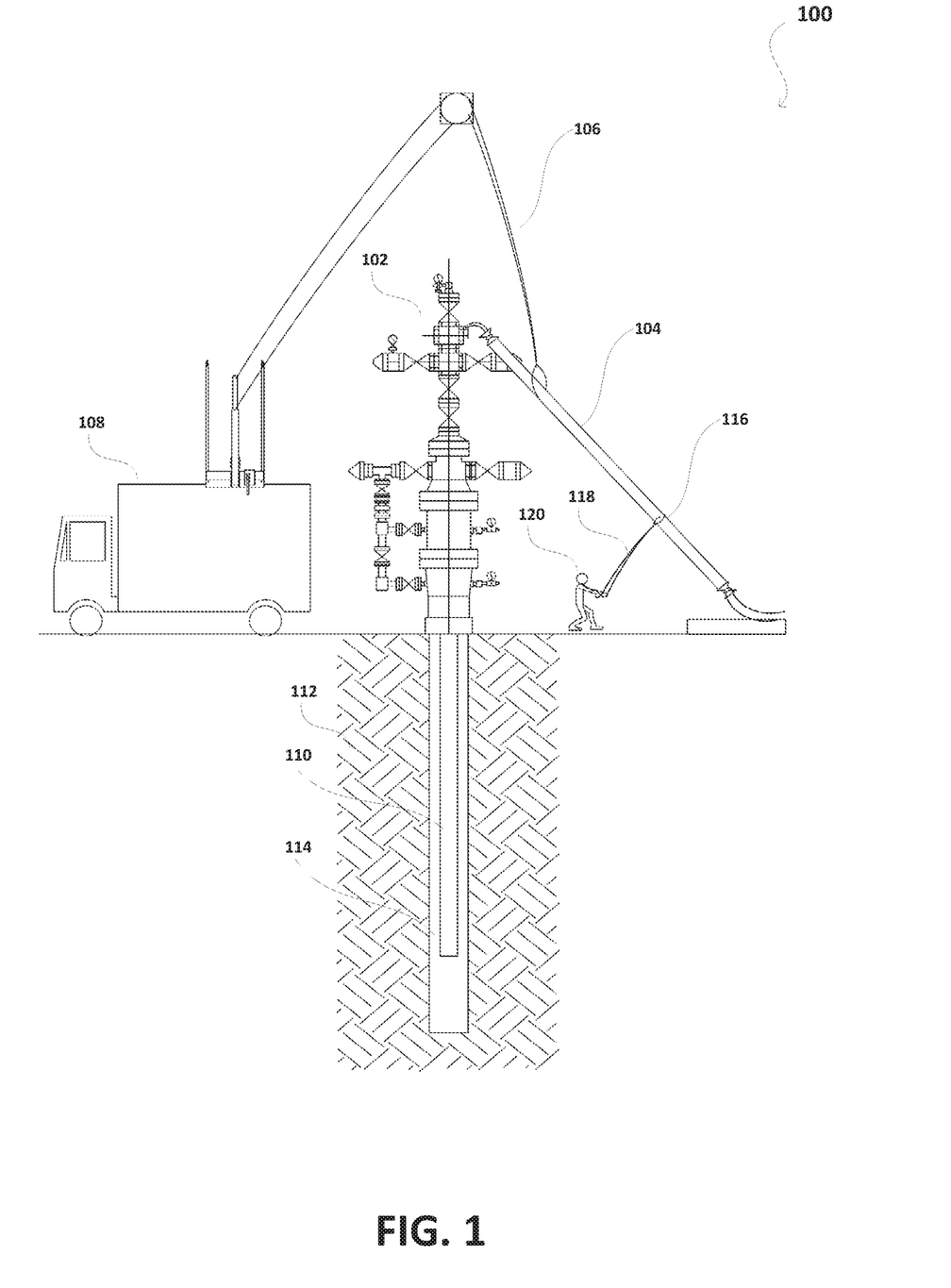
FIG. 1 is a schematic of an example riser hanging system in accordance with known aspects.

FIG. 1 is a schematic of an example riser hanging system 100 in accordance with known aspects. A hoisting system 108, such as mounted on a truck, may be used to hoist riser 104 for hanging in place with the wellhead 102. The hoisting system 108 may rely on cables 106 to hang the riser 104. In the riser hanging system 100, there may be a requirement for one or more human operators, such as operator 120, to use tag lines 118, with attachment 116 to the riser, to control the movement of the riser 104, while the hoisting system 108 makes simultaneous movements. The wellsite may include casing 114 driven into the subterranean region 112 and with a tubing riser 110 supporting the extraction of hydrocarbon products, for instance.

Figure 2:
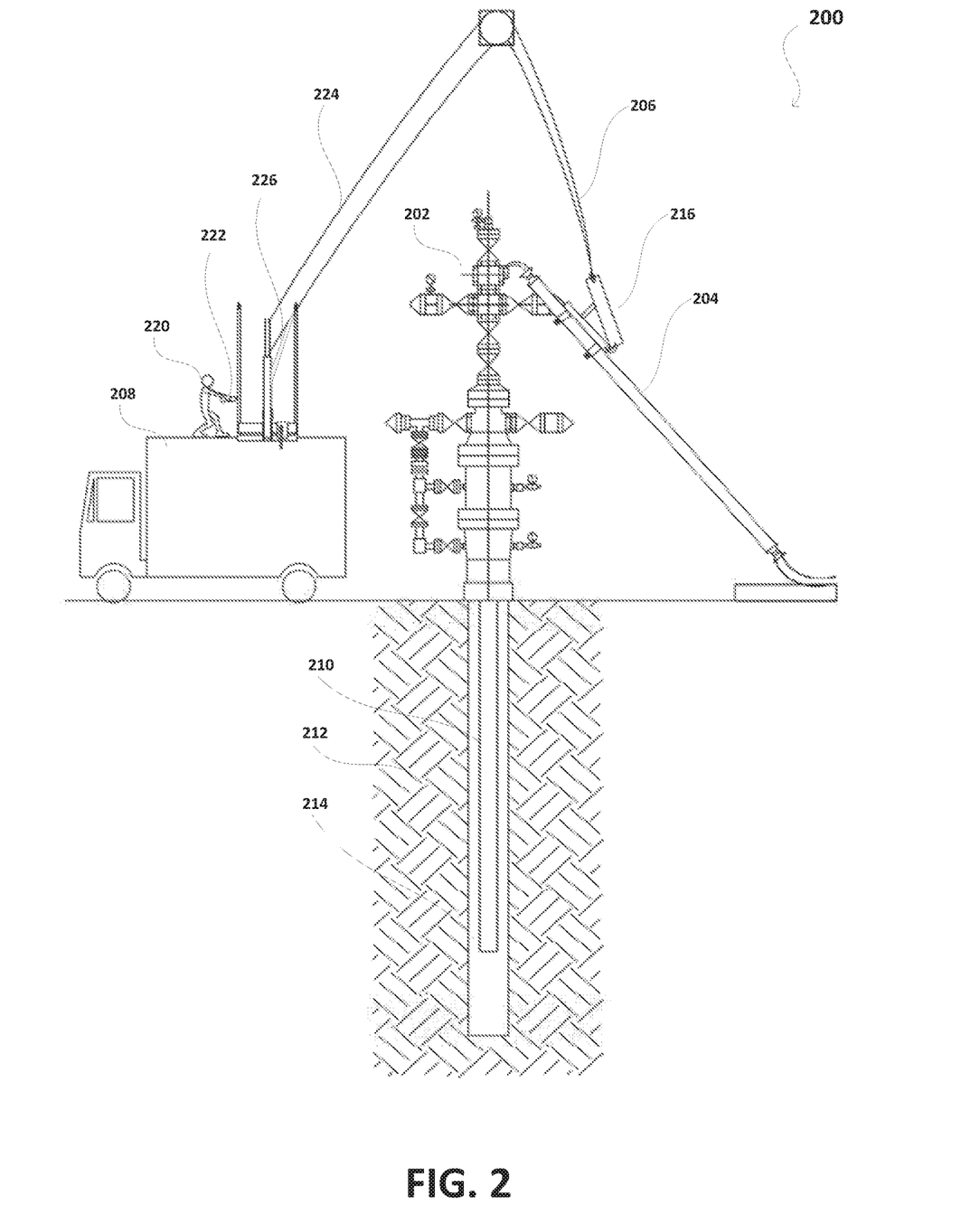
FIG. 2 is a schematic of an example riser hanging system in accordance with aspects of this disclosure.

FIG. 2 is a schematic of an example riser hanging system 200, according to aspects of this disclosure. The riser hanging system 200 relies on the riser hanging tool 216 to hang riser 204 in place with wellhead 202. The hoisting system 208 relies on cables 206 to hang the riser 204 with the wellhead 202. The riser hanging system 200, however, does not require the operator 220 to be in a vulnerable or dangerous position in the area of the riser as it is being hung. In addition, the use of the riser hanging tool 216 with its damping system, as discussed in more detail in the below aspects, provides accuracy and control over the process to hang riser 204 with the wellhead 202. The wellsite may include casing 214 driven into the subterranean region 212 and with a tubing riser 210 supporting the hydrocarbon products. This process reduces the risk of premature iron union failures of the risers to the wellhead due to fatigue and eliminates operators being exposed to the dangerous swinging overhead loads. Operator 220, in an example, may operate a hydraulic jack 226 at a location in a man basket using controls 222, away from the riser 204. A person of ordinary skill would recognize the requirement for the hydraulic jack 226 to move an arm 224 of the hoist 206°).

Figure 3:
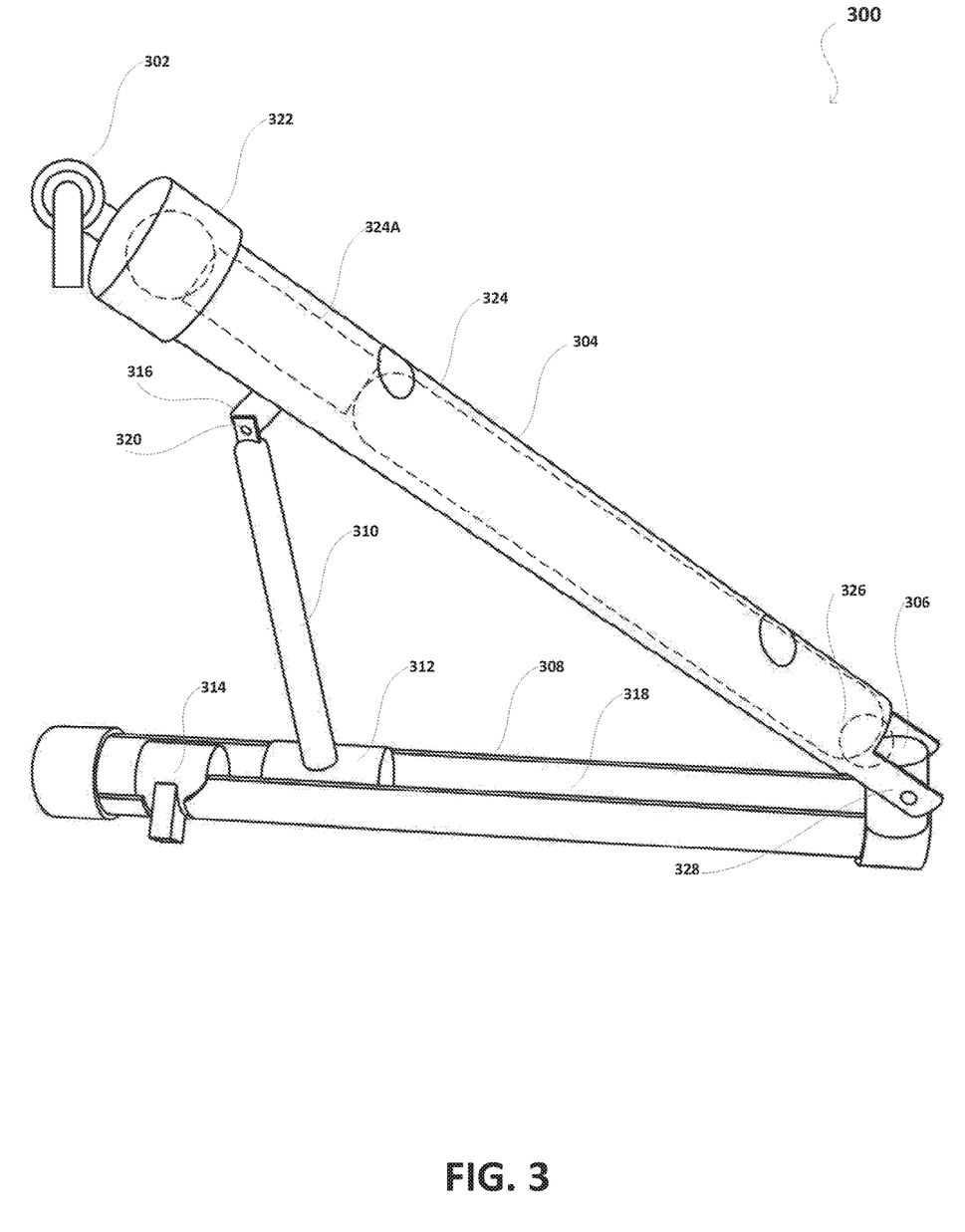
FIG. 3 illustrates of an example riser hanging tool to use in a riser hanging system, in accordance with aspects of this disclosure.

FIG. 3 is an illustration of an example riser hanging tool 300 for use in a riser hanging system, such as system 200, in accordance with aspects of this disclosure. The example riser hanging tool 300 may be an apparatus with various fixed and/or moving parts. For example, the riser hanging tool 300 includes a first elongated member 304 with a first provision 302 for an external mechanical coupling at a distal location on the first elongated member 304. A second elongated member 308 is provided for being mechanically coupled to the first elongated member 304. The riser hanging tool 300 is illustrated with the first elongated member 304 and the second elongated member 308 being hollow tubular members. However, the shape of the elongated members may be rectangular or square or any other reliable shape, by cross-section to support the loads and stresses at issue.

The mechanical coupling at second provision 306, between the first and the second elongated members 304, 308, may be at proximal locations on the first elongated member 304 and the second elongated member 308. The mechanical coupling at second provision 306 is achieved by a hinge functioning as the second provision 306. The proximal locations are distinct from the distal location of the first provision 302, which enables the external mechanical coupling between the riser hanging tool 300 and an external component. In an example, the first provision 302 may be a hooking part of a hoisting system that hooks the riser hanging tool 300 to an attached riser (not presently in the illustration of FIG. 3). A third member 310 is mechanically coupled to a first portion of the first elongated member 304. This may be a direct or indirect mechanical coupling. In an example, the first portion includes a damping system. The damping system may be or may include a hydraulic cylinder 324 (shown with dotted lines to represent that it may be within the first elongated member 304). An extension 316 from the hydraulic cylinder is provided for the mechanical coupling to the third member. In the example riser hanging tool 300, the hydraulic cylinder 324 may form the first portion of the first elongated member 304 or may be part of the first elongated member 304. In such a case, the first elongated member 304 may include a cap 322 for the first provision 302. The cap 322 forms another portion or may be an integral part of the first elongated member 304. The cap 322 may be integrally welded, for instance, to a body portion of the first elongated member 304. A person of ordinary skill would, therefore, recognize that the hydraulic cylinder may be fixed to the first elongated member 304 or may be a part of the first elongated member 304, but may also be removable.

The third member 310 may include a fourth member 312. The fourth member 312 is illustrated as a cylinder or specifically shaped member capable of traveling or moving in a hollow portion 318 of the second elongated members 308. This allows the fourth member 312 to move through at least a second portion (e.g., the hollow portion) of a length of the second elongated member 308. Further, one or more mechanical couplers may be associated with the second elongated member 308. One such coupler is marked by reference numeral 314, but a person of ordinary skill would recognize that multiple such couplers may be located throughout the second elongated member 308. The coupler 314 is provided for a second external mechanical coupling of the riser hanging tool 300 to the riser. In an implementation, when the riser hanging tool 300 is connected to the riser at the second elongated member 308 and when it is suspended by a hoist located at the provision 302, then the hydraulic cylinder 324 of the damping system is extended, such as by a piston 324A therein, and the extension 316 moves with the piston or spring of the hydraulic cylinder to move and/or rotate the third member 310. The extension 316 may be connected directly or indirectly to the piston 324A of the hydraulic cylinder 324. The provision 302 may be internally connected to the piston 324A, as well. In the implementation of FIG. 3, the fourth member 312 may be fixed or movable within the hollow portion 318. The fixed or movable aspects may be based in part on the angle of movement allowed to the riser relative to the hoist or the wellhead that is illustrated in FIG. 2. As sudden movements of the hoist are damped, it may also be the case that the corresponding movement applied to the third member 310 maintains the second elongated member 308 at an angle intended with respect to the first elongated member 304.

The hydraulic cylinder 324 may be fixed within the first elongated member 304 and form part of the damping system of the first portion of the first elongated member 304. Further, the hydraulic cylinder 324 may include a hinge 320 for the mechanical coupling with the third member 310. In an example, the riser hanging tool 300 relies on the hydraulic cylinder 324 being within the first elongated member 304 to move the third member 310 in an angle about the hinge 320.

Figure 5:
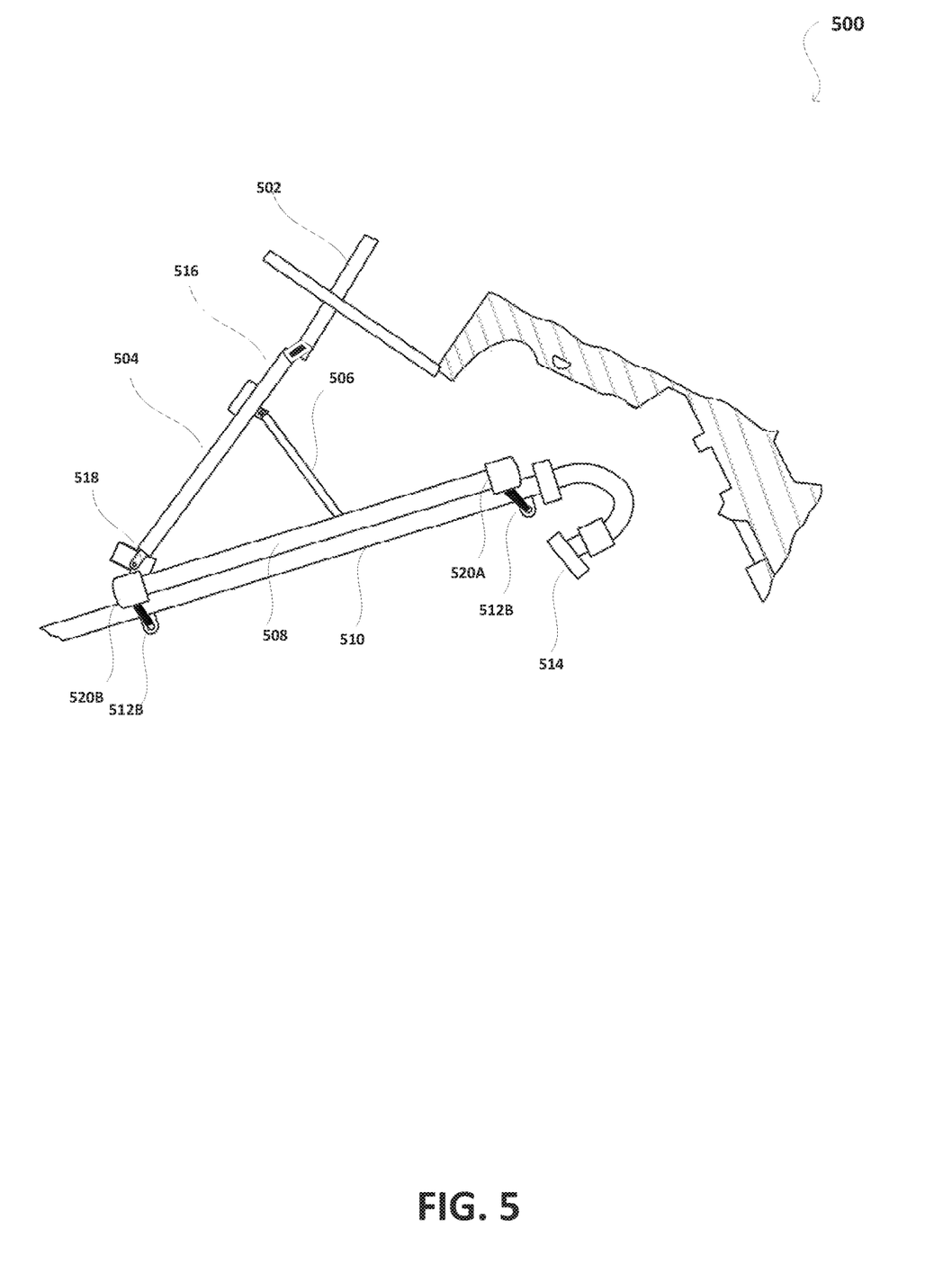

Further, an adjusting mechanism 326 for the hydraulic cylinder allows an operator (e.g., operator 220) to control the angle to and/or the speed with which the third member is moved. For example, the adjusting mechanism 326 may stiffen or restrict movement of a piston 324A in cylinder 324 to adjust the angle and/or the speed with which the third member is moved. The adjusting mechanism 326 may be a screw, a limiting lever, a fluid injector port (for adjusting a cylinder fluid), or other applicable feature that may be readily understood by a person of ordinary skill upon reading the present disclosure. Further, the adjusting mechanism may be located elsewhere, such as in cap 322, within the hollow area of the first elongation member 304, at the extension 316, or the second provision 306. The portion 318 of length of the second elongated member 308 is made hollow to support the fourth member 312 moving therein. This allows the first and the second elongated members 304, 308 to come closer together or move apart, along with some induced damping from the hydraulic cylinder as the riser is being moved. As such, accuracy is maintained by the damped movements of the riser when the hoisting system is moving the riser via the riser hanging tool 300. The sudden movements are reduced and more precise movements help the operators make connections required to hang the riser with the wellhead. Further, the mechanical coupler(s) 314 have latching features for latching around the riser of the wellhead. An example is provided via couplers 512A, 512B in FIG. 5. In an example, the latching features are integral to the couplers as illustrated in FIG. 5. As such, reference to couplers is used interchangeably with reference to latching features or a latching system.

The riser hanging tool 300 enables certain angles of movement for the riser, which may be determined from an Original Equipment Manufacturer's (OEM's) suggested specifications for the rise, for instance. The angles may be used to adjust the hydraulic cylinder 324 so that movement of its related piston 324A within the hydraulic cylinder 324, are adjusted, in turn. The amount of movement corresponds to the angular displacement allowed for the riser as it is hoisted into position. The adjustment, in an instance, may be in a range within the OEM's recommendation. In an example, the adjustment may be 35 degrees +/−5%. Thereafter one operator (e.g., operator 220) may be needed to operate a hydraulic jack 222, as illustrated in FIG. 2, at a location in a man basket, away from the riser 204. This eliminates a requirement for operators to stand close to a suspended riser. The riser hanging tool 300 may include a quick latch system 512A, 512B (illustrated as integral to or separate from couplers 520A, 520B in FIG. 5, for instance) that is located on the second elongated member 308 that can be quickly connected and disconnected with the riser pipe, for instance.

Figure 4:
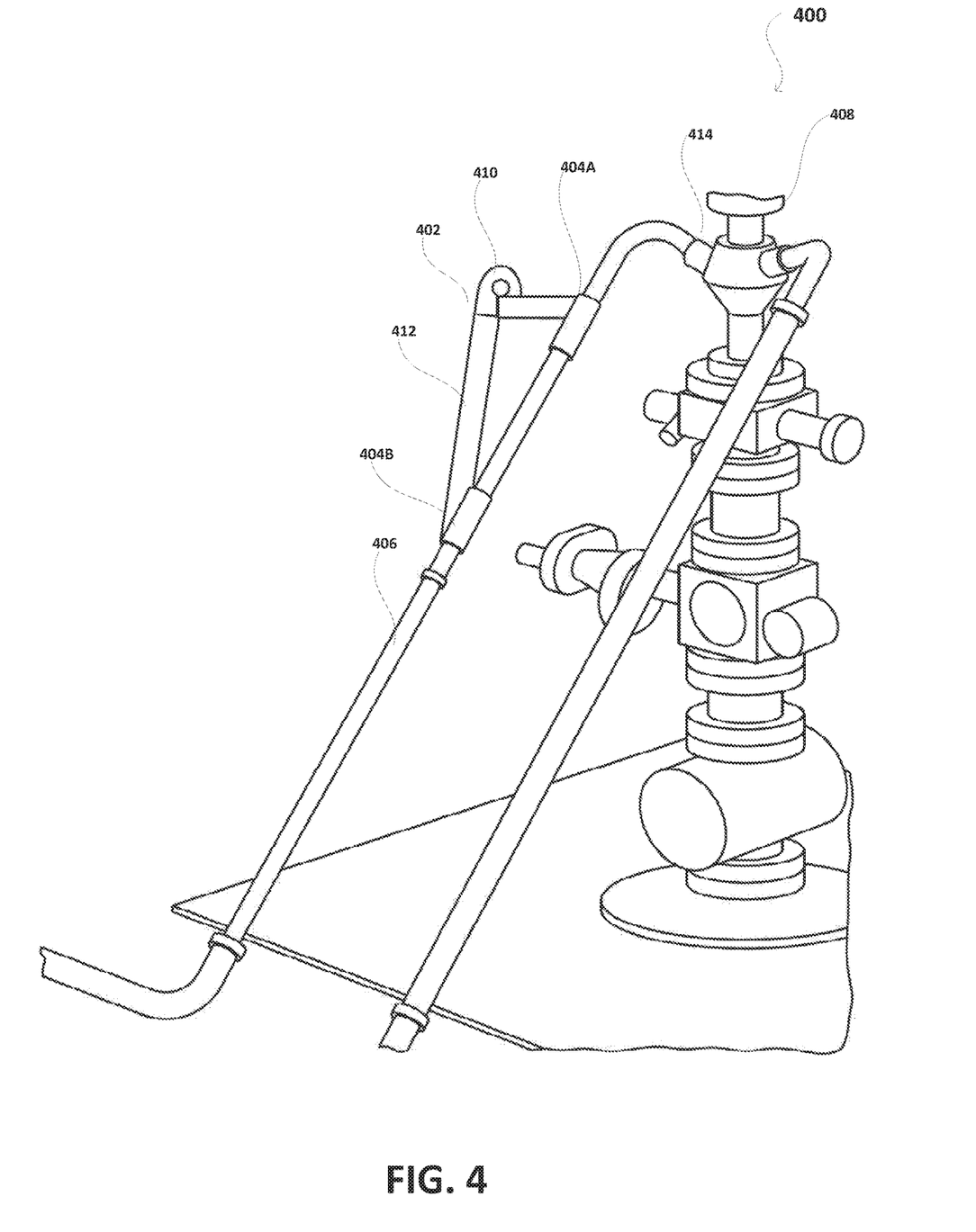
FIGS. 4 and 5 illustrate example riser hanging systems in different applications or stages of an application, in different views, according to aspects of this disclosure.

FIGS. 4 and 5 illustrate example riser hanging systems 400, 500 in different applications or stages of an application, in different views, according to aspects of this disclosure. FIG. 4 is a side perspective view of the riser hanging system 400 connected in a wellsite, for instance. FIG. 5 is a bottom perspective view of the riser hanging system 400 in an application for hoisting a riser 510 for connection in a wellsite, for instance. In these figures, the riser hanging systems (e.g., systems 400, 500) rely on an example riser hanging tool (e.g., riser hanging tool 300; 402) to hang riser 406 with wellhead 408. The riser hanging tool 402 includes the second elongated member (affixed behind the riser 406 and not show) that uses latches 404A, 404B on couplers (also not shown) for fixing with the riser 406 in a wellsite. The first elongated member 412 is illustrated with its distal end having the first provision 410 for the external mechanical coupling with a hoist of a riser hanging system. This may be a hooking part of the riser hoisting system that uses the riser tool 402 to hang the attached riser 406 with the wellhead 408 at its appropriate coupling point, such as at a reference area 414, in this example.

In FIG. 5, the example riser hanging system 500 is illustrated with the hoisting system 502 in the process of hanging riser 510. The riser 510 is not yet hung with a wellhead and remains uncoupled at its coupling point 514. The hoisting system 502 includes cables and an associated hoisting system, such as a crane or cabling system, to move the riser hanging tool 504 with the riser 510 using a mechanical coupling as referenced in the examples of FIGS. 2-4. The riser hanging tool 504 is illustrated with its second elongated member 508 attached to the riser 510 via latches (integral to or separate from couplers 520A, 520B) 512A and 512B. Latches 512A, 512B are removable to disassociate the tool 504 from the riser 510 after the riser is hung with the wellhead or after removal of the riser from the wellhead. The first elongated member 516 is illustrated in mechanical coupling with the second elongated member 508 via hinge 518 (also illustrated as reference numeral 328 in FIG. 3).

Figure 6:
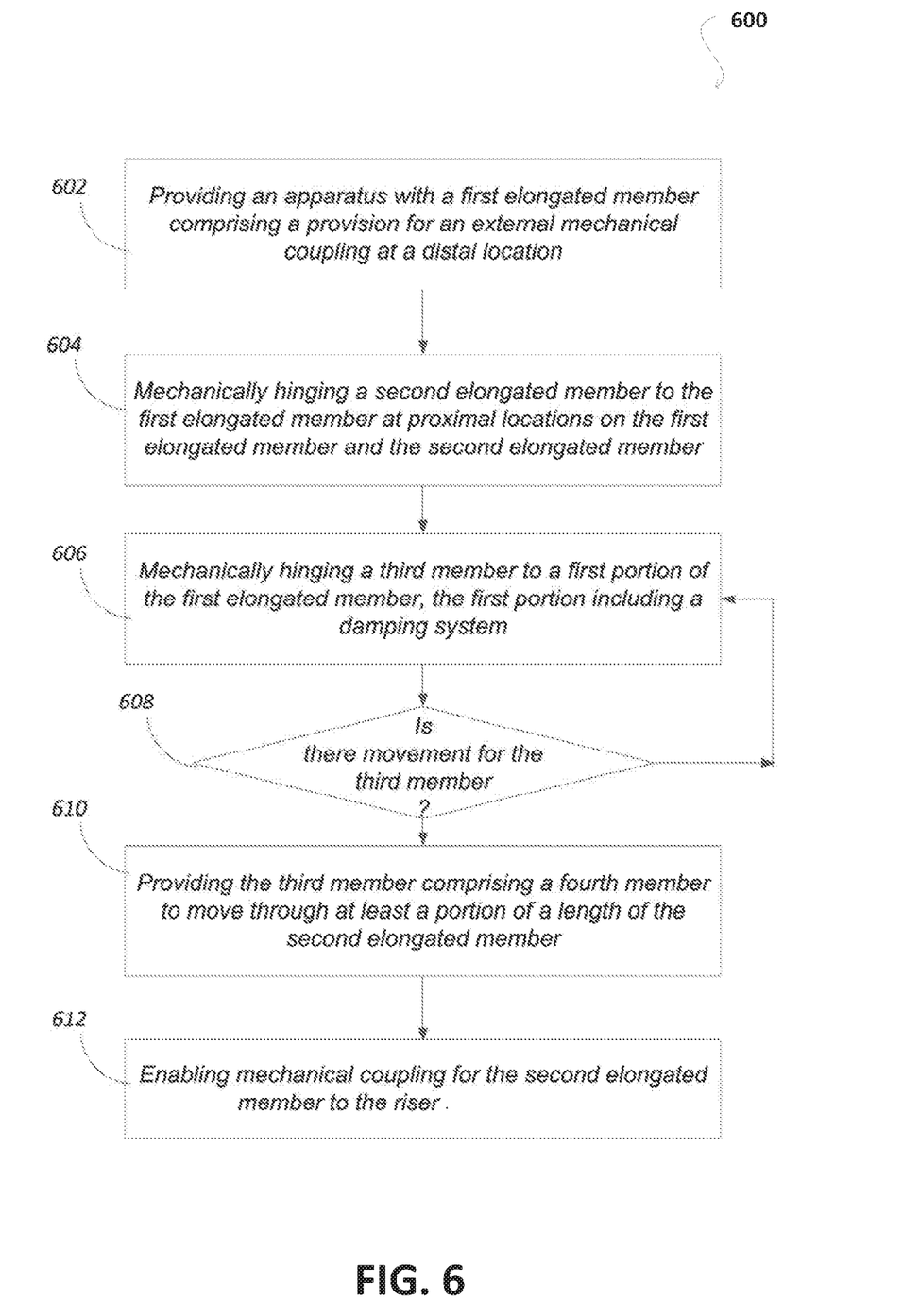
FIG. 6 is an example process for a riser hanging tool according to aspects of the embodiments herein.

FIG. 6 is an example process or method 600 for a riser hanging tool according to aspects of the embodiments herein. The process or method 600 is for providing a riser lifting tool and for lifting a riser associated with a wellhead using the riser lifting tool. Sub-process 602 provides an apparatus, such as the riser lifting tool, having a first elongated member and a provision for an external mechanical coupling at a distal location. Sub-process 604 mechanically hinges a second elongated member to the first elongated member at proximal locations on the first elongated member and the second elongated member. Sub-process 606 mechanically hinges a third member to a first portion of the first elongated member. The first portion may include a damping system, such as the damping system discussed with respect to the examples throughout this disclosure and particularly with respect to FIG. 3. Sub-process 608 verifies that sufficient movement for the third member is achieved in relation to one or more of the first elongated member and the second elongated member. Sub-process 610 provides the third member with a fourth member in any form of a mechanical coupling, by fixed coupling or using another hinge for a movable coupling, for instance. The fourth member is able to move through at least a first portion of a length of the second elongated member. Sub-process 612 enable mechanical coupling for the apparatus to the riser using at least one mechanical coupler on the second elongated member. As such, the example process 600 illustrates a riser lifting tool constructed at the wellsite or at a manufacturing location, for instance, and also illustrates lifting a riser associated with a wellhead using the riser lifting tool. The method enables the manufacture and use of the apparatus by enabling the coupling of components by an operator to put together the apparatus and to use the apparatus at a wellsite.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, other the recesses can be put into arrangements other than those described, such as all being in a vertical or other arrangement. These and other similar modifications will readily suggest themselves to those skilled in the art, and are intended to be encompassed within the spirit of the present invention disclosed herein and the scope of the appended claims.

In the various embodiments of the disclosure described, a person having ordinary skill in the art will recognize that alternative arrangements of components, units, conduits, and fibers could be conceived and applied to the present invention. The singular forms "a," "an," and "the" include plural referents, unless the context clearly dictates otherwise.

The invention claimed is:

1. An apparatus for hoisting functions, the apparatus comprising:
at least two members mechanically coupled together to enable relative movement between the at least two members;
a connecting member coupled to a first one of the at least two members and coupled to a moving member within a second one of the at least two members; and
a first mechanical coupler of the first one of the at least two members to be coupled to a hoist and a second mechanical coupler on the second one of the at least two members to be coupled to a riser.

2. The apparatus of claim 1, further comprising:
a damping system within the first one of the at least two members, the damping system coupled to the connecting member to dampen the relative movement between the at least two members.

3. The apparatus of claim 1, further comprising:
a hollow portion within the second one of the at least two members to comprise the moving member, the moving member movable within the hollow portion to limit an angle associated with the relative moment between the at least two members.

4. The apparatus of claim 1, further comprising:
a hinge enabling the at least two members to be mechanically coupled together at the proximal locations of the at least two members.

5. The apparatus of claim 1, further comprising:
a latching feature to provide the second mechanical coupler on the second one of the at least two members, the latching feature to enable latching of the apparatus to the riser.

6. The apparatus of claim 1, further comprising:
the at least two members mechanically coupled at proximal locations of the at least two members and the first mechanical coupler at a distal location of the first one of the at least two members.

7. The apparatus of claim 1, further comprising:
a hydraulic cylinder within the first one of the at least two members, the hydraulic cylinder having a piston that is coupled to the connecting member to dampen the relative movement.

8. The apparatus of claim 7, further comprising:
an adjustment feature for the hydraulic cylinder to enable adjustments to a stiffness of the piston that translates to a speed of the relative movement expected while lifting the riser.

9. The apparatus of claim 7, further comprising:
an adjustment feature for the hydraulic cylinder or the moving member, the adjustment feature to control an angle allowed for the relative movement between the at least two members.

10. The apparatus of claim 7, further comprising:
adjustment features for one or more of the hydraulic cylinder or the moving member, the adjustment features to control a speed of the relative movement and an angle allowed for the relative movement based at least in part on determined specifications for the riser.

11. A method for using or making an apparatus for hoisting functions, the method comprising:
providing at least two members having mechanical coupling there between to enable relative movement between the at least two members;
providing a connecting member coupled to a first one of the at least two members and coupled to a moving member within a second one of the at least two members;
coupling a first mechanical coupler of the first one of the at least two members to a hoist; and
coupling a second mechanical coupler on the second one of the at least two members to a riser.

12. The method of claim 11, further comprising:
providing a damping system within the first one of the at least two members, the damping system coupled to the connecting member to dampen the relative movement between the at least two members.

13. The method of claim 11, further comprising:
enabling a hollow portion within the second one of the at least two members to comprise the moving member, the moving member movable within the hollow portion to limit an angle associated with the relative moment between the at least two members.

14. The method of claim 11, further comprising:
enabling a hinge between the at least two members so that the at least two members are mechanically coupled together at the proximal locations of the at least two members.

15. The method of claim 11, further comprising:
providing a latching feature as the second mechanical coupler on the second one of the at least two members, the latching feature to enable latching of the apparatus to the riser.

16. The method of claim 11, further comprising:
mechanically coupling the at least two members at proximal locations of the at least two members so that the first mechanical coupler is at a distal location of the first one of the at least two members.

17. The method of claim 11, further comprising:
providing a hydraulic cylinder within the first one of the at least two members, the hydraulic cylinder having a piston that is coupled to the connecting member to dampen the relative movement.

18. The method of claim 17, further comprising:
providing an adjustment feature or an adjustment for the hydraulic cylinder, the adjustment feature or the adjustment to enable changes to a stiffness of the piston that translates to a speed of the relative movement expected while lifting the riser.

19. The method of claim 17, further comprising:
providing an adjustment feature or an adjustment for the hydraulic cylinder or the moving member, the adjustment feature or the adjustment to control an angle allowed for the relative movement between the at least two members.

20. The method of claim 17, further comprising:
providing adjustment features or adjustments for one or more of the hydraulic cylinder or the moving member, the adjustment features or the adjustments to control a speed of the relative movement and an angle allowed for the relative movement based at least in part on determined specifications for the riser.

* * * * *